(12) United States Patent
Yamada et al.

(10) Patent No.: US 11,984,618 B2
(45) Date of Patent: May 14, 2024

(54) NONAQUEOUS ELECTROLYTE SECONDARY BATTERY

(71) Applicant: TOYOTA JIDOSHA KABUSHIKI KAISHA, Toyota (JP)

(72) Inventors: Takanobu Yamada, Toyota (JP); Tetsuya Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/979,108

(22) Filed: Nov. 2, 2022

(65) Prior Publication Data
US 2023/0055772 A1 Feb. 23, 2023

Related U.S. Application Data

(63) Continuation of application No. 16/832,165, filed on Mar. 27, 2020, now Pat. No. 11,522,253.

(30) Foreign Application Priority Data

Apr. 9, 2019 (JP) ................................ 2019-074406

(51) Int. Cl.
*H01M 4/62* (2006.01)
*H01M 4/13* (2010.01)
(Continued)

(52) U.S. Cl.
CPC ............. *H01M 50/46* (2021.01); *H01M 4/13* (2013.01); *H01M 4/366* (2013.01); *H01M 4/628* (2013.01);
(Continued)

(58) Field of Classification Search
None
See application file for complete search history.

(56) References Cited

U.S. PATENT DOCUMENTS

2006/0008700 A1* 1/2006 Yong ................... H01M 50/417
429/251
2007/0264577 A1 11/2007 Katayama et al.
(Continued)

FOREIGN PATENT DOCUMENTS

JP 2013232425 A * 11/2013
JP 2015-072758 A 4/2015
(Continued)

OTHER PUBLICATIONS www.espacenet.com machine translation of the detailed description of JP 2017143004A. (Year: 2017).*
(Continued)

*Primary Examiner* — Gregg Cantelmo
(74) *Attorney, Agent, or Firm* — Oliff PLC

(57) ABSTRACT

A nonaqueous electrolyte secondary battery includes a positive electrode including a positive electrode collector, a positive electrode active material layer on part of the surface of the positive electrode collector, and an insulating layer on another part of the surface of the positive electrode collector; a negative electrode including a negative electrode collector; and a negative electrode active material layer on part of the surface of the negative electrode collector; a separator that insulates the positive and negative electrodes; and a nonaqueous electrolyte. A width of the negative electrode active material layer is wider than the positive electrode active material layer. The insulating layer protrudes from the negative electrode active material layer; and exhibits a thermal shrinkage factor of 13% or less in a direction parallel to the surface of a square insulating layer sample having a side length of 5 cm and heated at 150° C. for 1 hour.

20 Claims, 5 Drawing Sheets

(51) Int. Cl.
  *H01M 4/36* (2006.01)
  *H01M 10/0525* (2010.01)
  *H01M 10/653* (2014.01)
  *H01M 50/446* (2021.01)
  *H01M 50/46* (2021.01)

(52) U.S. Cl.
  CPC ..... *H01M 10/0525* (2013.01); *H01M 10/653* (2015.04); *H01M 50/446* (2021.01)

(56) References Cited

U.S. PATENT DOCUMENTS

| | | | |
|---|---|---|---|
| 2009/0067119 A1 | 3/2009 | Katayama et al. | |
| 2009/0092898 A1* | 4/2009 | Han | H01M 10/4235 429/185 |
| 2011/0003209 A1* | 1/2011 | Katayama | H01M 50/44 429/246 |
| 2014/0272532 A1* | 9/2014 | Park | H01M 50/461 429/144 |
| 2015/0180036 A1* | 6/2015 | Takebayashi | H01M 4/525 429/321 |
| 2017/0017533 A1 | 1/2017 | Hoebeke et al. | |
| 2017/0117533 A1* | 4/2017 | Takaichi | H01M 50/461 |
| 2018/0316052 A1 | 11/2018 | Arise et al. | |
| 2020/0328424 A1 | 10/2020 | Yamada et al. | |
| 2020/0328425 A1 | 10/2020 | Yamada et al. | |

FOREIGN PATENT DOCUMENTS

| | | | | |
|---|---|---|---|---|
| JP | 2017027927 A | * | 2/2017 | .......... H01M 10/049 |
| JP | 2017-143004 A | | 8/2017 | |
| JP | 2018098141 A | * | 6/2018 | |
| JP | 2019-021584 A | | 2/2019 | |
| KR | 10-2008-0073371 A | | 8/2008 | |

OTHER PUBLICATIONS

Machine translation of JP-2013232425-A. (Year: 2013).*
Machine translation of JP 2017027927A. (Year: 2017).*
Machine translation of JP 2018098141A. (Year: 2018).*
Apr. 26, 2022 Office Action issued in U.S. Appl. No. 16/832,165.
Mar. 31, 2022 Office Action issued in U.S. Appl. No. 16/832,037.
Sep. 30, 2022 Notice of Allowance issued in U.S. Appl. No. 16/832,037.
Aug. 3, 2022 Notice of Allowance issued in U.S. Appl. No. 16/832,165.

* cited by examiner

NONAQUEOUS ELECTROLYTE SECONDARY BATTERY

CROSS REFERENCE TO RELATED APPLICATION

The present application is a continuation application of U.S. patent application Ser. No. 16/832,165 filed Mar. 27, 2020, now U.S. Pat. No. 11,522,253 issued Dec. 6, 2022, and claims priority based on Japanese Patent Application No. 2019-074406, filed on Apr. 9, 2019. The entire contents of these applications are incorporated in the present specification by reference.

BACKGROUND OF THE DISCLOSURE

1. Field

The art disclosed herein relates to a nonaqueous electrolyte secondary battery.

2. Background

Nonaqueous electrolyte secondary batteries are lightweight and afford high energy densities, and therefore have come to be preferably used for instance as portable power sources and as high-output power sources installed in vehicles. Such nonaqueous electrolyte secondary batteries are provided with a spiral electrode body in which a power storage element, having a configuration in which a positive electrode and a negative electrode are insulated from each other by a separator or the like, is stacked and wound in a cylindrical shape or an elliptical cylindrical shape, within one battery case. The positive electrode and the negative electrode are designed so that the dimension of the negative electrode in the width direction thereof is greater than the dimension the positive electrode in the width direction thereof, in order to prevent precipitation of lithium ions on the negative electrode. For instance, Japanese Patent Application Publication No. 2017-143004 discloses such a secondary battery, provided with an insulating layer containing an inorganic filler along an edge of a positive electrode active material layer, on the surface of a positive electrode collector. This insulating layer allows preventing short circuits between the positive electrode collector and the edge of the opposing negative electrode active material layer.

A collecting section in which current is collected, within the positive electrode collector, is herein an uncoated section in which the active material layer is not formed. A problem arises in that due for instance to high current density in the vicinity of a collector terminal, the uncoated section of the positive electrode is likely to become oxidized, and prone to generate heat, on account of the high potential of the positive electrode. In particular, the collecting section of a secondary battery provided with an insulating layer in the positive electrode collector is covered by the insulating layer, and as a result the temperature of the collecting section is prone to rise. Studies by the inventors have revealed that for instance generation of heat by a battery may lead to short circuits even in secondary batteries provided with an insulating layer in an uncoated section of the positive electrode.

In the light of the above considerations, it is an object of the art disclosed herein to provide a nonaqueous electrolyte secondary battery that allows more suitably suppressing short circuits between a positive electrode collector and a negative electrode active material layer, even when the battery generates heat.

SUMMARY

In order to solve the above problem, the art disclosed herein provides a nonaqueous electrolyte secondary battery provided with a positive electrode, a negative electrode, a separator that insulates the positive electrode and the negative electrode, and a nonaqueous electrolyte. In this nonaqueous electrolyte secondary battery, the positive electrode includes a positive electrode collector; a positive electrode active material layer containing a positive electrode active material and provided on part of the surface of the positive electrode collector; and an insulating layer provided on another part of the surface of the positive electrode collector, so as to be adjacent to the positive electrode active material layer. The insulating layer contains an inorganic filler and a binder; and is configure to exhibit a value of 13% or less of a thermal shrinkage factor in a direction parallel to the surface of an evaluation sample of an insulating layer formed to a square shape having a length of each side of 5 cm and heated at 150° C. for 1 hour.

General separators are processed by stretching, and accordingly soften or melt, and undergo thermal shrinkage easily (for instance by 15% or more, typically by about 30%) as a result of being exposed to the above heating conditions while not being restrained in any way. In addition, also general binders soften or melt at the above temperature, and accordingly the insulating layer in the positive electrode can easily undergo thermal shrinkage (for instance by 15% or more, typically by about 20%), when exposed to the above heating conditions while not being restrained in any way. As a result, when an edge (which may be a corner) of the negative electrode active material layer in the width direction comes in contact with the insulating layer of the positive electrode, the insulating layer deforms easily, and a short circuit can occur between the positive electrode collector and the negative electrode active material layer. In the configuration described herein, by contrast, the thermal shrinkage factor in the surface direction is curtailed to 13% or less, even when the insulating layer is heated at 150° C. In an insulating layer where such a thermal shrinkage factor is obtained, thermal shrinkage is suppressed by virtue of the presence of the inorganic filler. A configuration can be achieved, thanks to such the inorganic filler, wherein even in a case where the negative electrode active material layer comes into contact with the insulating layer on account of thermal shrinkage of the separator, it is difficult for the negative electrode active material layer to reach the positive electrode collector through deformation of the insulating layer. As a result, short circuits between the positive electrode collector and the negative electrode active material layer can be suitably suppressed even in the case where the secondary battery generates heat.

In a preferred embodiment of the nonaqueous electrolyte secondary battery according to the present art, the inorganic filler contains plate-shaped particles. The inorganic filler may contain plate-shaped particles having an average aspect ratio of 3 or higher. In such a configuration, the thermal shrinkage factor of the insulating layer can be suitably curtailed to be 13% or less, even when the insulating layer is heated at 150° C., as described above. A further effect is elicited whereby even in the case of occurrence of for instance an internal short circuit, the surface area of that internal short circuit can be reduced, and widening of that surface area can be suppressed.

In a preferred embodiment of the nonaqueous electrolyte secondary battery according to the present art, the inorganic filler is at least one from among a boehmite powder and an alumina powder. The inorganic filler may be a boehmite powder. An insulating layer of superior heat resistance can be produced conveniently through the use of such a powder as the inorganic filler. In particular, the use of boehmite powder having a lower Mohs hardness than alumina allows suppressing generation of metallic foreign matter due to for instance to scraping of equipment contact sections during the production process.

In a preferred embodiment of the nonaqueous electrolyte secondary battery according to the present art, in the insulating layer, the proportion of the binder relative to the total of the inorganic filler and the binder is lower than 30 mass %. Such a configuration allows easily reducing the thermal shrinkage factor of the insulating layer to be 13% or less, even in a case where the insulating layer is heated at 150° C., as described above.

In a preferred embodiment of the nonaqueous electrolyte secondary battery according to the present art, the average thickness of the insulating layer is 10 μm or less. The secondary battery may be embodied so that the bulk and amount of the insulating layer provided in the positive electrode collector are small, from the viewpoint of reducing weight and costs. An insulating layer in which the thermal shrinkage factor can reach 13% or less allows for instance suitably suppressing short circuits derived from metal foreign matter, and curtailing the spread of the short circuits, even in a case where the average thickness of the insulating layer is set to be 10 μm or less. As a result a secondary battery is provided which is safe and in which reductions in both weight and cost are achieved.

The above nonaqueous electrolyte secondary battery is thus provided as a battery that is highly safe and in which short circuits between a positive electrode collector (uncoated section) and a negative electrode active material layer are suppressed, even at a high temperature of 150° C. The above safety at high temperature can be suitably applied to for instance secondary batteries provided with a multilayer structure (including multilayer electrode bodies and wound electrode bodies) in which multiple power storage elements are stacked, in applications where the temperature of the battery itself is prone to rise on account of repeated charging and discharge with large currents at a high rate. In addition, the above high safety can be suitably exploited in secondary batteries that are used in close proximity to a person, in applications where high safety is demanded. Therefore, the nonaqueous electrolyte secondary battery disclosed herein can be suitably used as a drive power source in vehicles (main power source); among the foregoing, the nonaqueous electrolyte secondary battery disclosed herein can be suitably used as a drive power source in plug-in hybrid vehicles or the like.

The above and other elements, features, steps, characteristics and advantages of the present invention will become more apparent from the following detailed description of the embodiments with reference to the attached drawings.

DETAILED DESCRIPTION

Figure 1:
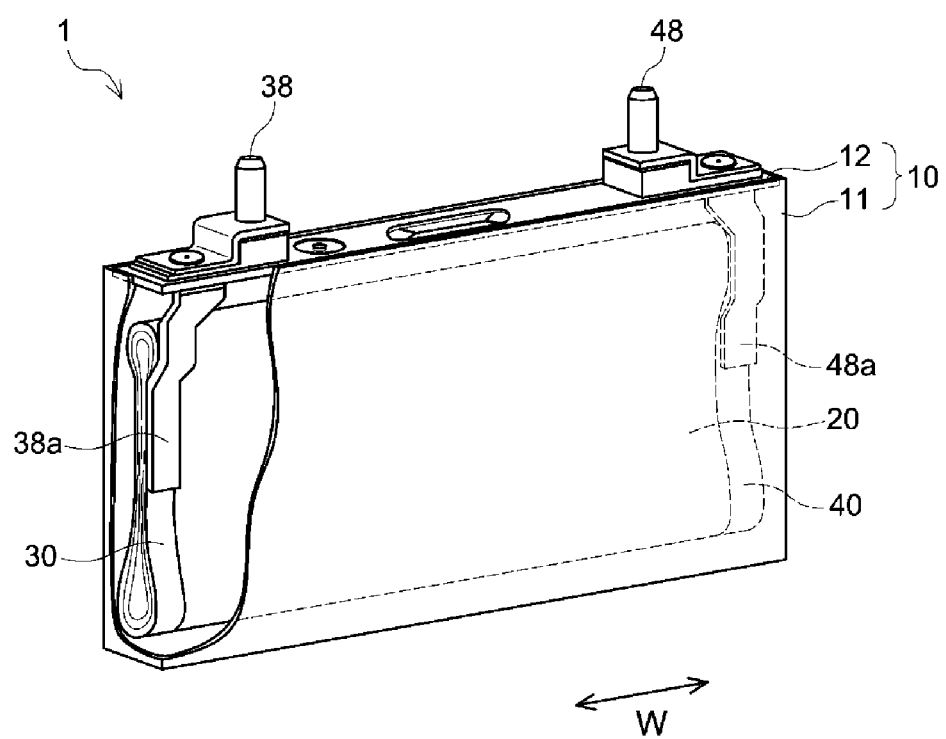
FIG. 1 is a cutaway perspective-view diagram illustrating schematically the configuration of a nonaqueous electrolyte secondary battery according to an embodiment.

An embodiment of the nonaqueous electrolyte secondary battery disclosed herein will be explained below. Any features other than the matter specifically set forth in the present specification (for instance the configuration of an insulating layer) and that may be necessary for carrying out the present invention (for instance structures and production processes of secondary batteries not being characterizing features of the present art) can be regarded as design matter for a person skilled in the art based on conventional art in the field in question. The art disclosed herein can be realized on the basis of the disclosure of the present specification and common technical knowledge in the relevant field. The dimensional relationships (length, width, thickness and so forth) in the drawings illustrated below do not necessarily reflect actual dimensional relationships. In the present specification, a numerical value range notated as "A to B" denotes "equal to or larger than A and equal to or smaller than B", and includes "for instance smaller than A" and "for instance smaller than B".

In the present specification, the term "nonaqueous electrolyte secondary battery" denotes a battery in general that utilizes a nonaqueous electrolyte as a charge carrier, such that the battery can be charged and discharged repeatedly accompanying the movement of charge carriers between the positive and negative electrodes. The electrolyte in the nonaqueous electrolyte secondary battery may be for instance any one from among a nonaqueous electrolyte solution, a gel-like electrolyte, and a solid electrolyte. Such nonaqueous electrolyte secondary batteries encompass generally batteries referred to for instance as lithium ion batteries or lithium secondary batteries, and include also for instance lithium polymer batteries and lithium ion capacitors. The art disclosed herein will be explained below on the basis of examples in which a nonaqueous electrolyte secondary battery is a lithium ion secondary battery.

Lithium Ion Secondary Battery

Figure 2:
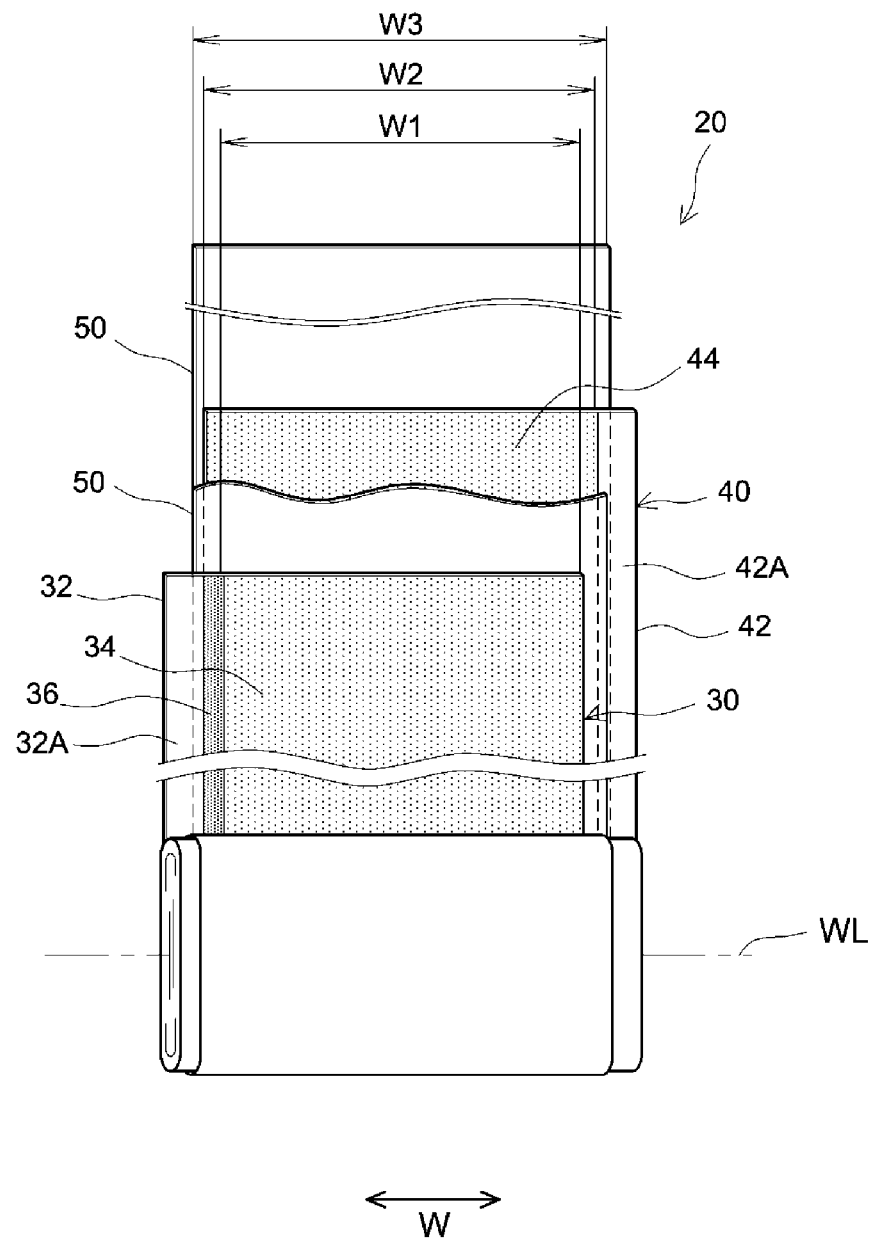
FIG. 2 is a partial development-view diagram for explaining the configuration of a wound electrode body.
Figure 3:
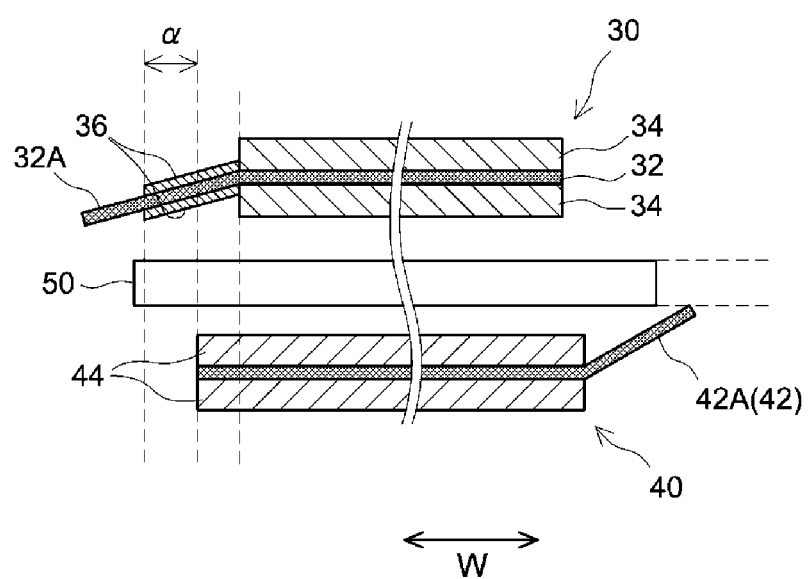
FIG. 3 is a cross-sectional diagram of a wound electrode body according to the present embodiment.

FIG. 1 is a cutaway perspective-view diagram illustrating the configuration of a lithium ion secondary battery (hereafter simply referred to for instance as "secondary battery") 1 according to an embodiment. The secondary battery 1 is configured by accommodating a wound electrode body 20 that has a positive electrode 30, a negative electrode 40 and a separator 50, in a battery case 10, together with a nonaqueous electrolyte solution (not shown). The reference symbol W in the figure denotes the width direction of the battery case 10 and of the wound electrode body 20, which is a direction that coincides with a winding axis WL of the wound electrode body 20 illustrated in FIG. 2. As illustrated in FIG. 2, the electrode body 20 is configured by laying up the separator 50, the negative electrode 40, the separator 50 and the positive electrode 30 in this order. FIG. 3 is a cross-sectional diagram of a main section of the electrode body 20.

The positive electrode 30 has a positive electrode collector 32, a positive electrode active material layer 34 and an insulating layer 36. The positive electrode active material layer 34 is a porous body containing a positive electrode active material, and which can be impregnated with an electrolyte solution. The positive electrode active material releases lithium ions, being charge carriers, into the electrolyte solution, or stores lithium ions from the electrolyte solution. The positive electrode active material layer 34 can contain additionally a conductive material and trilithium phosphate ($Li_3PO_4$; hereafter notated simply as "LPO"). The positive electrode active material layer 34 may be provided on part of the surface (one face or both faces) of the positive electrode collector 32. The positive electrode collector 32 is a member for holding the positive electrode active material layer 34, and for supplying and recovering charge to/from the positive electrode active material layer 34. The positive electrode collector 32 is suitably made up of a conductive member containing a metal (for instance aluminum, an aluminum alloy, nickel, titanium and stainless steel) having good conductivity and that is electrochemically stable in the positive electrode environment within the battery.

In the positive electrode active material layer 34, particles of a granular positive electrode active material are typically bonded to each other, together with a conductive material, and also to the positive electrode collector 32, by means of a binder. Various materials used conventionally as positive electrode active materials in lithium ion secondary batteries can be used herein as the positive electrode active material, without particular limitations. Preferred examples include particles of an oxide (lithium-transition metal oxide) made up of lithium and a transition metal element, such as lithium nickel oxide (for instance $LiNiO_2$), lithium cobalt oxide (for instance $LiCoO_2$) and lithium manganese oxide (for instance $LiMn_2O_4$), as well as composites of the foregoing (for instance $LiNi_{0.5}Mn_{1.5}O_4$ and $LiNi_{1/3}Co_{1/3}Mn_{1/3}O_2$), and also particles of a phosphate salt having lithium and a transition metal element as constituent metal elements, for instance lithium manganese phosphate ($LiMnPO_4$) and lithium iron phosphate ($LiFePO_4$). Such a positive electrode active material layer 34 can be produced for instance by supplying a positive electrode paste resulting from dispersing a positive electrode active material, a conductive material and a binder (for instance an acrylic resin such as a methacrylate polymer, a vinyl halide resin such as polyvinylidene fluoride (PVdF), or a polyalkylene oxide such as polyethylene oxide (PEO)), in an appropriate dispersion medium (for instance N-methyl-2-pyrrolidone), onto the surface of the positive electrode collector 32, followed by removal of the dispersion medium by drying. In a configuration including a conductive material, for instance a carbon material such as carbon black (typically acetylene black or ketjen black), activated carbon, graphite or carbon fibers can be suitably used as the conductive material. The foregoing may be used as any one type singly, or in the form of combinations of two or more types.

The average particle size ($D_{50}$) of the positive electrode active material particles is not particularly limited, and is typically 1 µm or more, for instance 3 µm or more, or 5 µm or more, and is typically 15 µm or less, for instance 10 µm or less or 8 µm or less. The proportion of the positive electrode active material in the positive electrode active material layer 34 as a whole can be about 75 mass % or more, typically 80 mass % or more, for instance 85 mass % or more, and can be typically 99 mass % or less, for instance 95 mass % or less. The proportion of the conductive material in the positive electrode active material layer 34 can be typically 1 parts by mass or more, for instance 3 parts by mass or more, or 5 parts by mass or more, and can be typically 15 parts by mass or less, for instance 12 parts by mass or less, or 10 parts by mass or less, relative to 100 parts by mass of the positive electrode active material. The proportion of the binder in the positive electrode active material layer 34 can be typically 0.5 parts by mass or more, for instance 1 parts by mass or more, or 1.5 parts by mass or more, and can be typically 10 parts by mass or less, for instance 8 parts by mass or less, or 5 parts by mass or less, relative to 100 parts by mass of the positive electrode active material. The thickness (average thickness; likewise hereafter) of the positive electrode active material layer 34 after pressing can be typically 10 µm or more, for instance 15 µm or more, and can be typically 50 µm or less, or 30 µm or less, for instance 25 µm or less. The density of the positive electrode active material layer 34 is not particularly limited, but can be typically set to 1.5 g/cm³ or higher, for instance 2 g/cm³ or higher, and may be set to 3 g/cm³ or lower, for instance 2.5 g/cm³ or lower.

Unless otherwise specified, the term "average particle size" in the present specification denotes a cumulative 50% particle size ($D_{50}$) in a volume-basis particle size distribution obtained in accordance with a laser diffraction-light scattering method. Herein $D_{10}$ denotes a particle size corresponding to a cumulative 10%, $D_{90}$ denotes a particle size corresponding to a cumulative 90%, and $D_{max}$ denotes a mode diameter, from the small particle size side, in the above particle size distribution.

Studies by the inventors have revealed that in a configuration in which the positive electrode active material layer 34 contains LPO, this LPO reacts with acids generated by oxidative decomposition of the electrolyte solution, which results in leaching of phosphate ions ($PO_4^{3-}$). The phosphate ions can reach the negative electrode, and form a coating film that suitably suppresses exothermic reactions in the negative electrode, thereby suitably enhancing the overcharge resistance of the secondary battery. In an embodiment, a configuration can be adopted in which the positive electrode active material layer 34 contains LPO, from the viewpoint of suppressing generation of heat in the secondary battery 1. The proportion of LPO in a case where the positive electrode active material layer 34 contains LPO is suitably set to 0.88 to 8.8 parts by mass relative to 100 parts by mass of the positive electrode active material, from the viewpoint of both achieving an effect of enhancing the overcharge resistance elicited by LPO, and also raising the viscosity of the positive electrode paste, while increasing productivity, at the time of production of the positive electrode. The specific surface area of LPO is suitably set to 0.9 to 20.3 m²/g, from the viewpoint of improving overcharge resistance and reducing reaction resistance. The average particle size of LPO may be 1 µm or more, preferably 2 µm or more, and for instance 2.5 µm or more, and may be preferably 30 µm or less, more preferably 8 µm or less, for instance 5 µm or less. Further, the $D_{90}$ of LPO may be preferably 60 µm or less, more preferably 40 µm or less, or 20 µm or less. Next, the $D_{10}$ of LPO may be preferably 0.3 µm or more, more preferably 0.6 µm or more, or 0.8 µm or more. Further, the D. of LPO may be preferably 80 µm or less, more preferably 60 µm or less, or 50 µm or less.

The insulating layer 36 contains an inorganic filler and a binder, and has electrical insulating properties. Such an insulating layer 36 is typically formed through binding of inorganic filler particles to each other, and to the positive electrode collector 32, by way of the binder. The insulating layer 36 may be a porous layer that allows charge carriers to pass therethrough. As illustrated in FIGS. 2 and 3, the insulating layer 36 is provided in a region which is part of the surface (one face or both faces) of the positive electrode collector 32, the region being adjacent to the positive electrode active material layer 34. In other words, the insulating layer 36 is provided along an edge of the positive electrode active material layer 34 in the width direction. The insulating layer 36 is provided at least in a region opposing the negative electrode active material layer 44, and being a region (region in which the positive electrode active material layer 34 is not formed), adjacent to the positive electrode active material layer 34. In an example, as illustrated in FIG. 3, the insulating layer 36 may protrude by a dimension a outward the negative electrode active material layer 44 (leftward in the figure), in the width direction. The dimension a is designed to a dimension such that, also in a case where positional deviation occurs in the negative electrode active material layer 44, the edge of the negative electrode active material layer 44 can be sufficiently covered by the insulating layer 36, so as to avoid a situation in which the negative electrode active material layer 44 and the positive electrode collector 32 oppose each other only across the separator 50. The dimension a may be designed to a dimension that allows sufficiently covering the edge of the negative electrode active material layer 44 also in a case where the insulating layer 36 undergoes thermal shrinkage in a high-temperature environment. Further, the dimension a may be designed to a dimension such that the insulating layer 36 does not protrude beyond the edge of the separator 50 in the width direction, in order to prevent foil puckering defects in the collector 32 (uncoated section 32A). The dimension a may be set, although not limited thereto, for instance to 113% or more, and for instance 150% or less, of the dimension by which the negative electrode active material layer 44 protrudes beyond the positive electrode active material layer 34. An uncoated section 32A in which the positive electrode collector 32 is exposed may be provided, for the purpose of power collection, on the insulating layer 36, on the side not adjacent to the positive electrode active material layer 34.

Examples of the inorganic filler that makes up such an insulating layer 36 and can be used include a heat-resistant and electrochemically stable material that is capable of insulating the positive and negative electrodes from each other, without softening or melting at a temperature of 600° C. or higher, typically 700° C. or higher, and for instance 900° C. or higher. The inorganic filler can be made up typically for instance of an inorganic material or glass material, or a composite material thereof, having heat resistance and insulating properties. Concrete examples of such inorganic fillers include specifically inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolite, apatite and kaolin; and glass materials. Preferred inorganic fillers among the foregoing include boehmite ($Al_2O_3.H_2O$), alumina ($Al_2O_3$) and silica ($SiO_2$), in terms of affording stable quality and also low cost and ready availability, and more preferably boehmite of appropriate hardness. The inorganic filler may contain any one type of the foregoing, singly or combinations of two or more types.

For instance, various binders that can be used in positive electrode active material layers may be used herein as the binder contained in the insulating layer 36. Among the foregoing, a vinyl halide resin such as polyvinylidene fluoride (PVdF) can be preferably used as the binder, from the viewpoint of suitably forming an insulating layer 36 of appropriate thickness, while imparting thereto flexibility at the time of current collection through bundling of a plurality of positive electrode collectors 32. For instance the proportion of the binder contained in the insulating layer 36 is typically 1 mass % or more, preferably 5 mass % or more, and may be 8 mass % or more, or 10 mass % or more. For instance the binder contained in the insulating layer 36 may be typically, 30 mass % or less, or 25 mass % or less, or 20 mass % or less, or 18 mass % or less, or 15 mass % or less. In a representative example, the binder may be adjusted as appropriate to be 5 to 20 mass %. The basis weight of such an insulating layer 36 may be for instance about 0.5 mg/cm$^2$ or more, 0.7 mg/cm$^2$ or more, or 1 mg/cm$^2$ or more, and may be 1.5 mg/cm$^2$ or less, 1.3 mg/cm$^2$ or less, or 1.2 mg/cm$^2$ or less.

The insulating layer 36 is configured to allow preventing short circuits between the positive electrode collector 32 and the negative electrode active material layer 44 also in a case for instance where the secondary battery 1 is exposed at a high-temperature environment at 150° C. Herein 150° C. is a significantly higher value than a shutdown temperature designed for separators having a general shutdown function. Specifically, an evaluation sample of the insulating layer 36, formed to a square shape having a length of each side of 5 cm, exhibits a value of 13% or less of a thermal shrinkage factor in a direction parallel to the surface of the evaluation sample of an insulating layer when subjected to a heating treatment at 150° C. for 1 hour. Although the insulating layer 36 is formed on the positive electrode collector 32, the surface of the insulating layer 36 is not restrained by another member such as a separator. Therefore, the above thermal shrinkage factor is a value measured in a state where the evaluation sample of an insulating layer, produced in the same way as the insulating layer 36, is independent. In other words, the thermal shrinkage factor is measured in a state where the shrinkage of the evaluation sample of an insulating layer in the surface direction is not restricted. For instance, the thermal shrinkage factor is a factor at the time of heating of the evaluation sample of an insulating layer placed on a top plate of a heating furnace or a sample case, in a state of having been stripped from a base material or the like. Therefore, the above thermal shrinkage factor is clearly distinguished from, for instance, a thermal shrinkage factor that is measured under a condition where shrinkage in the surface direction of the evaluation sample of an insulating layer is restricted, for example in a state where the evaluation sample of an insulating layer remains formed on the surface of the base material, or a state in which the evaluation sample of an insulating layer is sandwiched between plates or the like for simulating a stacked state in the interior of a multilayer electrode body. The thermal shrinkage factor in the evaluation sample of an insulating layer can be measured suitably for instance in accordance with the method described in the working examples below.

It is found that when the thermal shrinkage factor of the evaluation sample of an insulating layer is 13% or less, any further thermal shrinkage is suppressed by the inorganic filler, even with the binder in a softened or melted state. Therefore, deformation (shrinkage) of the insulating layer 36 can be suppressed, and insulating properties can be ensured, even when physical forces act on the insulating layer 36, thanks to the presence of the inorganic filler. The thermal shrinkage factor may be preferably 12% or less, more preferably 10% or less, for instance 8% or less, or 6% or less, or 4% or less. The lower limit of the thermal shrinkage factor may be 0%, but sufficient insulating properties at high-temperature can be ensured even when the thermal shrinkage factor is 1% or more, for instance 2% or more.

Figure 4A:
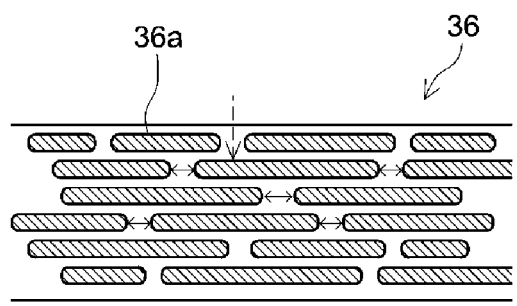
FIGS. 4A and 4B are cross-sectional schematic diagrams for explaining the influence of the shape of an inorganic filler contained in an insulating layer.

The shape of the inorganic filler is not particularly limited, and the inorganic filler may adopt various shapes, for instance spherical, granular, plate-shaped or fibrous shapes. From the viewpoint of suitably achieving the above thermal shrinkage factor, the inorganic filler is preferably made up of a powder that contains plate-shaped particles. Plate-shaped particles have shape anisotropy. An inorganic filler 36a within the insulating layer 36 can be brought to a plane orientation, so that the planes of the plate-shaped particles are substantially parallel to the surface of the insulating layer 36, as illustrated in FIG. 4A, by virtue of the fact that the particles that make up the inorganic filler are plate-shaped particles. A large resistance acts within the insulating layer 36, since in order for the inorganic filler 36a to move in the thickness direction of the insulating layer 36, all the inorganic filler 36a that is present in the movement direction has to be displaced. When moving in the surface direction, within the insulating layer 36, the inorganic filler 36a can move easily by the extent of the gaps between adjacent particles, in the surface direction, but in order to move any further, it is necessary to displace all the inorganic filler 36a present in the movement direction, and a large resistance acts as a result. In consequence, also at the time of shrinkage of the insulating layer 36 in the surface direction, a large resistance acts after the insulating layer 36 has shrunk by a certain extent. As a result the shrinkage factor (including the thermal shrinkage factor) of the insulating layer 36 in the surface direction is restricted to be relatively small, in a case where the inorganic filler 36a is made up of plate-shaped particles.

The term plate-shaped particles denotes particles having a size, in one given dimension, that is significantly smaller (which can be for instance 80% or less, or 50% or less, or 40% or less, or 30% or less), than that of so-called spherical particles, in other words denotes flat thin particles. Therefore, the plate-shaped particles can contain particles manifested for instance in the form of scaly particles. However, the plate-shaped particles do not include particles having significantly small size in two dimensions, for example particles manifested as rod-shaped or needle-shaped particles. The feature wherein the inorganic filler contains plate-shaped particles signifies herein that 50 number % or more (preferably 80 number % or more) of the particles that make up the inorganic filler are plate-shaped particles having an aspect ratio of 1.2 or higher (for instance 1.5 or higher, or 2 or higher, or 2.5 or higher, or 3 or higher). The proportion of these plate-shaped particles may be calculated on the basis of results of observation of 100 or more inorganic filler particles using an electron microscope (typically a transmission electron microscope (TEM); likewise hereafter) at appropriate magnifications.

The average aspect ratio of the inorganic filler may be appropriately 2.5 or higher, and is preferably 3 or higher, for instance 4 or higher, or 5 or higher, or 6 or higher, or 7 or higher, or 8 or higher. The upper limit of the average aspect ratio of the inorganic filler is not particularly restricted, but as a yardstick, may be set for example to about 20 or less, for instance from the viewpoint of handleability and particle strength. The term "average aspect ratio" in the present specification denotes an arithmetic mean value of the ratio (diameter/thickness) of diameter in a plan view with respect to the thickness of the inorganic filler particles, as measured by observing 20 or more inorganic filler particles using an electron microscope. For instance a biaxial average diameter of the inorganic filler particles can be used herein as the diameter. For instance an arithmetic mean value of thickness, at two or more points of an inorganic filler particle, can be taken herein as the diameter of the particle.

Figure 4B:
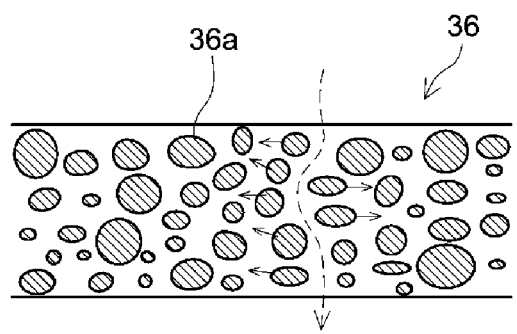

By contrast, the shape anisotropy of spherical particles is small. Accordingly, spherical particles may be present randomly in the insulating layer 36, as illustrated in FIG. 4B, in a case where the particles that make up the inorganic filler are spherical particles. In the movement of the inorganic filler 36a in the surface direction, within the insulating layer 36, the inorganic filler 36a moves easily until coming into contact with an adjacent particle in the surface direction; upon contact thereafter with an adjacent particle, the former particle moves towards a gap in the periphery, as a result of which the former particle can further move in the thickness direction and the surface direction. Upon contact of a given particle with an adjacent particle, that adjacent particle is caused to move towards a gap in the periphery, by virtue of which the former particle can further move in the surface direction. Resistance in this case can be made smaller than the resistance to movement of plate-shaped particles, until a high state of spherical particle filling is brought about. In a case where the inorganic filler 36a is made up of spherical particles, the shrinkage factor (including the thermal shrinkage factor) of the insulating layer 36 in the surface direction becomes relatively large as a result.

The thickness (average thickness; likewise hereafter) of the insulating layer 36 is not limited in strict terms, but In a case for instance where metal foreign matter intrudes between the positive electrode and the negative electrode, it is preferable that the thickness of the insulating layer 36 should allow sufficiently suppressing short circuits, derived from this metal foreign matter, between the positive electrode collector 32 and the negative electrode active material layer 44, derived from this metal foreign matter. From this viewpoint, the thickness of the insulating layer 36 may be 1 μm or more, preferably 3 μm or more, and more preferably for instance 4 μm or more. However, the volume of the insulating layer 36 is preferably as small as possible, since the insulating layer 36 may give rise to foil puckering and may impair welding workability. From this standpoint, the insulating layer 36 may be 20 μm or less, for instance 18 μm or less, or 15 μm or less, or 10 μm or less (for instance smaller than 10 μm), and may be 8 μm or less, for instance 6 μm or less, or 5 μm or less. For example a ratio (T1/T2) of T1 and T2, where T1 denotes the thickness of the insulating layer 36 and T2 denotes the thickness of the positive electrode active material layer, is 1 or lower, typically 1/2 or lower, preferably 2/5 or lower, more preferably 1/3 or lower, and yet more preferably 1/4 or lower, or 1/5 or lower. The ratio (T1/T2) may be 1/10 or higher, for instance 1/8 or higher, and 1/6 or higher, from the viewpoint of sufficiently bringing out the function of the insulating layer 36. The thickness T1 of the insulating layer 36 is the height of the insulating layer 36 from the surface of the positive electrode collector 32, and does not include the thickness of the portion formed through overlap of the insulating layer 36 on the positive electrode active material layer 34.

The average particle size of the inorganic filler is not particularly limited. Typically, the average particle size is 3 μm or less, preferably 2 μm or less, and for instance 1 μm or less, from the viewpoint of suitably forming the insulating layer 36 of the above thickness. An excessively fine inorganic filler is however poor in handleability and homogeneous dispersibility, and is therefore undesirable. Accordingly, the average particle size of the inorganic filler is typically 0.05 μm or more, preferably 0.1 μm or more, and for instance 0.2 μm or more. This average particle size is a cumulative 50% particle size in a volume-basis particle size distribution obtained by laser diffraction/scattering, similarly to that of for instance positive electrode active material.

In a preferred embodiment of the insulating layer 36 disclosed herein, the insulating layer 36 is characterized by further containing LPO. Given that the insulating layer 36 contains LPO, this LPO leaches from the insulating layer 36 at the time of overcharge, and allows effectively forming, on the surface of the negative electrode 40, a good coating film that suitably contributes to suppressing generation of heat in the negative electrode 40. Studies by the inventors have revealed that by providing the insulating layer 36 in the vicinity of a positive electrode collecting section that can be readily brought to a high-potential state during current collection, and by arranging LPO in the insulating layer 36, a configuration can be achieved in which in particular exothermic reactions in the negative electrode can be effectively suppressed by a coating film derived from the LPO. Configurations where an insulating layer is provided at the edge of a positive electrode coating are well known (see for instance Japanese Patent Application Publication No. 2017-143004), but the particular contribution towards overcharge resistance, elicited by arranging LPO in the insulating layer 36, is a novel feature hitherto unknown. Such a configuration allows effectively inhibiting further exothermic reactions on the surface of the negative electrode, and for instance further improving the overcharge resistance of the battery.

The shape of LPO in a case where the insulating layer 36 contains LPO is not particularly limited. For instance, LPO of properties identical to LPO contained in the positive electrode active material layer 34 above can be used as LPO herein. However, the cost of LPO is comparatively high, and accordingly, it is preferable that LPO allows forming suitably the insulating layer 36 of the above thickness and can leach promptly into the electrolyte solution when the battery reaches an overcharge state. From this viewpoint, the average particle size of LPO may be typically 10 μm or less, preferably 8 μm or less, for instance 5 μm or less, and typically 1 μm or more, preferably 2 μm or more, and may be set to for instance 2.5 μm or more.

Further, preferably D1, D2<D3 is satisfied, preferably D1<D2 is satisfied, and more preferably D1<D2<D3 is satisfied, where D1 denotes the average particle size of the inorganic filler, D2 denotes the average particle size of LPO in the insulating layer 36, and D3 denotes the average particle size of the above positive electrode active material. By virtue of the fact that D1, D2<D3 is satisfied, it becomes for instance possible to suitably prevent that the surface height position of the insulating layer 36 from the surface of the positive electrode collector 32 should become higher than the surface height position of the positive electrode active material layer 34 from the surface of the positive electrode collector 32, when the insulating layer 36 is formed so as to overlap the edge of the positive electrode active material layer 34. Further, by virtue of the fact that D1<D2 is satisfied, the strength of the insulating layer 36 can be ensured by a fine inorganic filler; also, insulating properties can be secured, and short circuits between the positive electrode collector 32 and the negative electrode active material layer 44 can be suppressed yet more suitably, even in the case of leach of LPO. Further, LPO can be disposed in the insulating layer 36 so as to leach readily.

The negative electrode 40 is configured by being provided with the negative electrode active material layer 44 on a negative electrode collector 42. An uncoated section 42A in which the negative electrode active material layer 44 is not formed and in which the negative electrode collector 42 is exposed may be provided, for the purpose of power collection, on the negative electrode collector 42. The negative electrode active material layer 44 contains a negative electrode active material. In the negative electrode active material layer 44, particles of a granular negative electrode active material are typically bonded to each other, and to the negative electrode collector 42, by means of a binder. The negative electrode active material stores lithium ions, which are charge carriers, from the electrolyte solution, and releases the lithium ions to the electrolyte solution, accompanying charging and discharge. Various materials used conventionally as negative electrode active materials in lithium ion secondary batteries can be used herein as the negative electrode active material, without particular limitations. Preferred examples include lithium storage compounds such as carbon materials, for instance man-made graphite, natural graphite, amorphous carbon, and composites thereof (for instance amorphous carbon-coated graphite), and materials that form an alloy with lithium, such as silicon (Si), lithium alloys of the foregoing (for instance $Li_xM$, where M is for example C, Si, Sn, Sb, Al, Mg, Ti, Bi, Ge, Pb or P, and X is a natural number), as well as silicon compounds (for instance SiO). Such a negative electrode 40 can be produced for instance by supplying a negative electrode paste resulting from dispersing a powdery negative electrode active material and a binder (for instance a rubber such as a styrene butadiene copolymer (SBR) or an acrylic acid-modified SBR resin (SBR-based latex), or a cellulosic polymer such as carboxymethyl cellulose (CMC)) in an appropriate dispersion medium (for instance water or N-methyl-2-pyrrolidone, preferably water), onto the surface of the negative electrode collector 42, followed by removal of the dispersion medium by drying. A conductive member containing a metal having good conductivity (for instance copper, nickel, titanium or stainless steel) can be suitably used as the negative electrode collector.

The average particle size ($D_{50}$) of the negative electrode active material particles is not particularly limited, and may be for instance 0.5 μm or more, preferably 1 μm or more, and more preferably 5 μm or more. Further, the average particle size may be 30 μm or less, preferably 20 μm or less, and more preferably 15 μm or less. The proportion of the negative electrode active material in the negative electrode active material layer 44 as a whole is appropriately set to about 50 mass % or more, preferably to 90 mass % to 99 mass %, and for instance to 95 mass % to 99 mass %. In a case where a binder is used, the proportion of the binder in the negative electrode active material layer 44 can be set for instance to about 0.1 parts by mass to 5 parts by mass, and ordinarily is appropriately set to about 0.5 parts by mass to 2 parts by mass, relative to 100 parts by mass of the negative electrode active material. The thickness (average thickness; likewise hereafter) of the negative electrode active material layer 44 is for instance set to be 10 μm or more, typically 20 μm or more, and may be set to be 80 μm or less, typically 50 μm or less. The density of the negative electrode active material layer 44 is not particularly limited, and may be for instance 0.8 g/cm$^3$ or higher, typically 1.0 g/cm$^3$ or higher, and may be set to be 1.5 g/cm$^3$ or lower, typically 1.4 g/cm$^3$ or lower, and for instance 1.3 g/cm$^3$ or lower.

A coating film (not shown) derived from LPO may be provided on the surface of the negative electrode active material layer 44. This coating film may be formed through initial charging, after battery assembly, or may be formed through overcharge. The coating film derived from LPO can be checked through detection of components of phosphate ions ($PO_4^{3-}$) or phosphorus (P) on the surface of the negative electrode active material layer. As an example, the negative electrode active material layer is punched to a predetermined size, and the resulting surface is washed with an acidic solvent (for instance sulfuric acid), to thereby elicit leaching of phosphate ions ($PO_4^{3-}$) and phosphorus (P) components. Phosphorus atoms from the obtained leached solution are determined quantitatively for instance by inductively coupled plasma-optical emission spectrometry (ICP-OES), and phosphate ions can be quantified by ion chromatography, to thereby enable grasping the presence, and formation amount, of the LPO-derived coating film that becomes formed on the surface of the negative electrode active material layer. The qualitative and quantitative analysis methods of the phosphate ions ($PO_4^{3-}$) and phosphorus (P) components can be properly selected, by a person skilled in the art, from among the above examples and known methods in analytical chemistry, taking into consideration for instance the influence of additives and the like of the electrolyte solution.

The separator 50 is a constituent element that insulates the positive electrode 30 and the negative electrode 40 and that provides movement paths for charge carriers between the positive electrode active material layer 34 and the negative electrode active material layer 44. Such a separator 50 is typically disposed between the positive electrode active material layer 34 and the negative electrode active material layer 44. The separator 50 may have a function of holding a nonaqueous electrolyte solution, and a shutdown function of blocking the movement paths of the charge carriers at a predetermined temperature. Such a separator 50 can be suitably configured out of a microporous resin sheet made of a resin such as polyethylene (PE), polypropylene (PP), polyester, cellulose or polyamide. Among the foregoing, a microporous sheet made of a polyolefin resin such as PE or PP is preferred herein since such a sheet allows suitably setting a shutdown temperature to lie in the range of 80° C. to 140° C. (typically 110° C. to 140° C., for instance 120° C. to 135° C.). The shutdown temperature is the temperature at which electrochemical reactions of the battery are stopped when the battery generates heat, the shutdown being typically manifested in the form of melting or softening of the separator 50 at that temperature. Such a separator 50 may have a single-layer structure made up of a single material, or a structure (for instance a three-layer structure in which a PP layer is laid up on both faces of a PE layer) being a stack of two or more types of microporous resin sheets having different materials and/or properties (for instance average thickness and/or porosity).

The thickness of the separator 50 (average thickness; likewise hereafter) is not particularly limited, but can be ordinarily set to 10 μm or more, typically 15 μm or more, and for instance 17 μm or more. The upper limit of the thickness can be set to be 40 μm or less, typically 30 μm or less, and for example 25 μm or less. The permeability of charge carriers can be maintained satisfactorily, and small short circuits (leak currents) become unlikelier to occur, by virtue of the fact that the average thickness of the base material lies within the above ranges. As a result, it becomes possible to achieve input-output density and safety at a high level.

Examples of the nonaqueous electrolyte solution which can be typically used include, without particular limitations, a solution resulting from dissolving or dispersing a supporting salt (for instance a lithium salt, a sodium salt or a magnesium salt, or a lithium salt in a lithium ion secondary battery) as an electrolyte, in a nonaqueous solvent. Alternatively, the nonaqueous electrolyte solution may be for instance a so-called polymer electrolyte or solid electrolyte made into a gel through addition of a polymer to a liquid nonaqueous electrolyte. Examples of the nonaqueous solvent which can be used include, without particular limitations, various types of organic solvent, for instance carbonates, ethers, esters, nitriles, sulfones, lactones and the like that are utilized as electrolyte solutions in general lithium ion secondary batteries. Specific examples thereof include linear carbonates such as diethyl carbonate (DEC), dimethyl carbonate (DMC) and ethyl methyl carbonate (EMC), as well as cyclic carbonates such as ethylene carbonate (EC) and propylene carbonate (PC). Among the foregoing, preferably the nonaqueous solvent partially contains for instance a solvent (for example a cyclic carbonate) that generates hydrogen ions by decomposing in an acidic atmosphere of the positive electrode. Such a nonaqueous solvent may be fluorinated. The nonaqueous solvent may be used singly, or in combinations of two or more types. Various salts that are used in general lithium ion secondary batteries can be selected and used herein as the supporting salt. Examples thereof include lithium salts such as $LiPF_6$, $LiBF_4$, $LiClO_4$, $LiAsF_6$, $Li(CF_3SO_2)_2N$ and $LiCF_3SO_3$. In the art disclosed herein an effect is elicited of suppressing generation of heat at the time of overcharge, and accordingly it is preferable to use, as the supporting salt, for instance a lithium compound that contains fluorine and which generates hydrogen fluoride (HF) by decomposing at the time of overcharge, since in that case the effect of the present invention is elicited more pronouncedly. Such a supporting salt may be used singly, or in combinations of two or more types. The supporting salt is preferably adjusted so that the concentration thereof in the nonaqueous electrolyte nonaqueous electrolyte lies in the range of 0.7 mol/L to 1.3 mol/L.

The nonaqueous electrolyte may contain various additives, so long as the characteristics of the lithium ion secondary battery disclosed herein are not impaired thereby. The additives, which may be for instance a gas generating agent, a film forming agent and so forth, can be used for one, two or more purposes from among for instance improving the input-output characteristics, improving the cycle characteristics, and improving initial charge and discharge efficiency, of the battery. Concrete examples of such additives include fluorophosphates (preferably difluorophosphate salts, for example lithium difluorophosphate represented by $LiPO_2F_2$), as well as oxalate complex compounds such as lithium bis(oxalato)borate (LiBOB). The concentration of the additives with respect to the nonaqueous electrolyte as a whole is appropriately set ordinarily to 0.1 mol/L or less (typically 0.005 mol/L to 0.1 mol/L).

The secondary battery illustrated in FIG. 1 utilizes a flat rectangular battery case as the battery case 10. However, the battery case 10 may be a non-flat rectangular battery case, a cylindrical battery case, a coin-type battery case or the like. Alternatively, the secondary battery 1 may be a laminate bag formed through bonding of a metal-made battery case sheet (typically an aluminum sheet) and a resin sheet, to yield a bag shape. For instance, the battery case may be formed out of aluminum or iron, or a metal alloy of the foregoing, or out of high-strength plastic. The secondary battery 1 illustrated in FIG. 1 has for instance a so-called wound electrode body 20 of a form resulting from laying of an elongate positive electrode 30 and an elongate negative electrode 40, insulated from each other by two separators 50, the resulting stack being then wound, to yield an oval cross section, around a winding axis WL. As illustrated in FIG. 2 and FIG. 3, a width W1 of the positive electrode active material layer 34, a width W2 of the negative electrode active material layer 44, and a width W3 of the separators satisfy the relationship W1<W2<W3. The negative electrode active material layer 44 covers the positive electrode active material layer 34, at both edges in the width direction, and the separator 50 covers the negative electrode active material layer 44 at both edges in the width direction. Each insulating layer 36 covers at least the positive electrode collector 32, in a region opposing the edge of the negative electrode active material layer 44, while being adjacent to a respective positive electrode active material layer 34. However, the electrode body 20 of the secondary battery 1 disclosed herein is not limited to being a wound electrode body, and may be an electrode body 20 in the form of so-called flat laminated type in which for instance a plurality of positive electrodes 30 and negative electrodes 40 are laid up while insulated from each other by respective separators 50. Alternatively, single cells each having one positive electrode 30 and one negative electrode 40 may be accommodated individually in a battery case.

The battery case 10 is typically made up of a case body 11 having an opening on one face, and a lid member 12 that covers the opening. Similarly to battery cases of conventional lithium ion batteries, the lid member 12 may be provided with for instance a safety valve for venting, to the exterior, gas generated within the battery case, and with a filling port for injecting the electrolyte solution. A positive electrode terminal 38 and a negative electrode terminal 48 for external connection can be typically disposed, on the lid member 12, while insulated from the battery case 10. The positive electrode terminal 38 and the negative electrode terminal 48 are electrically connected to the positive electrode 30 and the negative electrode 40 via a positive electrode collector terminal 38a and a negative electrode collector terminal 48a, respectively, and are configured to be capable of supplying power to an external load.

The lithium ion secondary battery disclosed herein can be used in various applications, but can be for instance a battery that affords also high safety upon repeated charging and discharge at a high rate, as compared with conventional batteries. Moreover, such superior battery performance and reliability (including safety such as thermal stability at the time of overcharge) can be brought out at a high level. Therefore, the lithium ion secondary battery disclosed herein can be preferably used, by exploiting such characterizing features, in applications that demand high energy density and high input-output density, and applications that require high reliability. Examples of such applications include drive power sources installed in vehicles such as plug-in hybrid vehicles, hybrid vehicles, and electric vehicles. The secondary battery can be used in the form of an assembled battery typically resulting from connecting a plurality of the secondary batteries in series and/or in parallel.

The nonaqueous electrolyte secondary battery disclosed herein was produced in concrete working examples below. The present art is however is not meant to be limited to these concrete examples.

Shrinkage Factor of Samples for Insulating Layer Evaluation

Samples for evaluation of an insulating layer, for the purpose of evaluating an insulating layer, were prepared herein. Firstly, eight metal oxide powders having different shapes and compositions were prepared as respective inorganic fillers. Specifically, as listed in Table 1, the inorganic fillers in Examples 1 to 4, 6 and 7 are plate-shaped boehmite powders having different aspect ratios, in the range from 8.5 to 1.2. The inorganic filler in Example 8 is a spherical boehmite powder having an aspect ratio of 1.1. The inorganic filler in Example 5 is a plate-shaped alumina powder having an aspect ratio of 3.2. The average aspect ratio of each inorganic filler is an arithmetic mean value of aspect ratio calculated on the basis of a biaxial average diameter and the thickness of 20 or more filler particles, for each sample, measured by TEM observation.

Insulating layer pastes of Examples 1 to 8 were prepared by mixing the respective inorganic filler (F) of each example, and PVdF (B) as a binder, in a proportion of F:B=85 to 70:15 to 30, as given in Table 1, and by dispersing the resulting mixture in N-methyl-2-pyrrolidone (NMP) as a dispersion medium, and kneading the whole. The solids concentration of the insulating layer pastes was set to about 20 to 24 mass %. The amount of binder was set to the amount necessary in order to maintain the coating properties (for instance viscosity) of the paste, derived from differences in the shape of the inorganic filler, at a given reference. Each insulating layer paste was applied on the surface of a film made of polyethylene terephthalate (PET) with release agent, and the paste was dried, to thereby prepare a respective insulating layer for evaluation. The thickness of the insulating layers for evaluation in the respective examples was set to about 5 µm, and the basis weight was set to lie in the range of about 1.2 to 0.7 g/cm².

The prepared insulating layer of each example was stripped off the PET film, to yield a sheet-shaped insulating layer that was then punched into a 5 cm square piece, serving as a respective evaluation sample. A cross mark having arms 3 cm long was carefully stamped on the center of the evaluation sample, to mark thus the sample with reference lines. The evaluation sample was heated by being kept in a thermostatic bath at 150° C. for 1 hour. A shrinkage factor was then calculated on the basis of the dimensions of the reference lines measured before and after heating, in accordance with the following expression: shrinkage factor (%)= (dimension before heating−dimension after heating)÷dimension before heating×100. Respective arithmetic means of the measured dimensions of two lines intersecting longitudinally and transversally were used as the dimension before heating and the dimension after heating of the reference lines. The results are given in Table 1 below.

Short Circuit Test

Construction of Nonaqueous Electrolyte Secondary Batteries for Short Circuit Test Evaluation samples (5 cm square) of the insulating layers of Examples 1 to 8 were prepared as described above.

Further, nonaqueous electrolyte secondary batteries were produced in accordance with the procedure below. Specifically, a complex oxide ($LiNi_{1/3}Co_{1/3}Mn_{1/3}O_2$:NCM) of layered structure and containing lithium, nickel, cobalt and manganese, as a positive electrode active material, acetylene black (AB) as a conductive aid, and polyvinylidene fluoride (PVdF) as a binder were mixed at a mass ratio of NCM: AB:PVdF=90:8:2, and were kneaded with N-methyl-2-pyrrolidone (NMP) as a solvent, to prepare a positive electrode paste. The prepared positive electrode paste was applied on both faces of an elongate aluminum foil 12 µm thick, as a positive electrode collector, with drying, to yield a positive electrode having a positive electrode active material layer. An uncoated section in which the positive electrode active material layer was not formed was provided along one of the edges of the positive electrode, in the width direction, for the purpose of power collection.

Further, graphite (C) as a negative electrode active material, styrene butadiene rubber (SBR) as a binder, and carboxymethyl cellulose (CMC) as a thickener were kneaded, at a mass ratio of C:SBR:CMC=98:1:1, with ion-exchanged water, to thereby prepare a negative electrode paste. The prepared negative electrode paste was applied on both faces of an elongate copper foil 10 μm thick, as a negative electrode collector, with drying, to yield a negative electrode provided with a negative electrode active material layer. An uncoated section, for the purpose of power collection, in which the negative electrode active material layer was not formed, was provided along one of the edges of the negative electrode, in the width direction.

Figure 5:
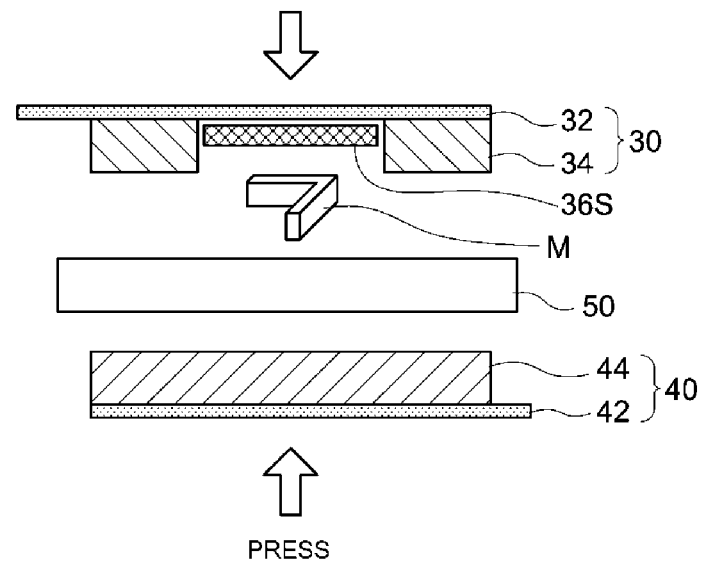
FIG. 5 is a cross-sectional schematic diagram for explaining the configuration of an electrode body produced in a working example.
Figure 6:
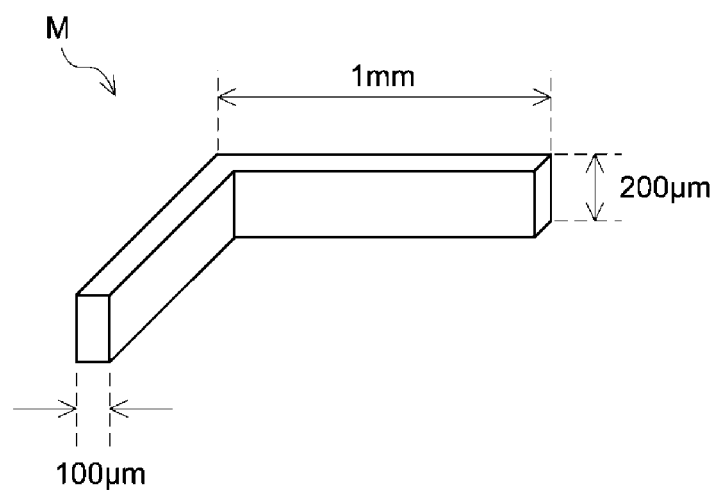
FIG. 6 is a perspective-view diagram for explaining the configuration of a metal foreign fragment used in working examples.

The prepared positive electrode and the negative electrode were superimposed across two separators in between, so that the positive electrode and the negative electrode were insulated from each other, and the resulting stack was then wound, to thereby construct a wound electrode body. As illustrated schematically in FIG. 5, the positive electrode active material layer at the edge of the positive electrode, on the winding start side, was peeled partially, to expose the positive electrode collector, an evaluation sample of an insulating layer (36S) of each of Examples 1 to 8 and an L-shaped metal foreign fragment (M) were arranged, and the whole was wound, to thereby yield the wound electrode bodies of Examples 1 to 8. The evaluation sample of an insulating layer and the metal foreign fragment were positioned at substantially the center of the wound electrode body in the width direction, the height direction, and the thickness direction. The positive electrode and the negative electrode were superimposed on each other in such a manner that an uncoated section of the positive electrode and an uncoated section of the negative electrode were positioned on opposite sides in the width direction. As illustrated in FIG. 6, the metal foreign fragment that was used had an L-shape 100 μm wide and 200 μm high, the arms of the L-shape being each 1 mm long; the metal foreign fragment was disposed in the center of each evaluation sample of an insulating layer in such a manner that the thickness direction of the metal foreign fragment coincided with the stacking direction. Porous sheets having a three-layer structure of PP/PE/PP were used as the separators.

A flat rectangular battery case made of an aluminum alloy was prepared as the battery case. The positive electrode uncoated section and the negative electrode uncoated section in the wound electrode body of each example were respectively connected to a positive electrode terminal and a negative electrode terminal of the battery case, and the whole was accommodated in the case body together with a nonaqueous electrolyte solution, followed by sealing, to thereby obtain nonaqueous electrolyte secondary batteries for evaluation of Examples 1 to 8. A solution resulting from dissolving $LiPF_6$ as a supporting salt, to a concentration of 1 mol/L, in a mixed solvent containing ethylene carbonate (EC), ethyl methyl carbonate (EMC) and dimethyl carbonate (DMC) at a volume ratio of EC:EMC:DMC=3:3:4, was used as the nonaqueous electrolyte solution.

Measurement of Voltage Drop and Highest Temperature Reached at Time of Short Circuit The secondary battery of each example was charged at constant current (CC) at a rate of 1/3 C up to a voltage of 4.1 V, in a temperature environment of 25° C., and thereafter was charged at constant voltage (CV) until current was 1/50C. As a result, the secondary batteries of the examples were subjected to an activation treatment. Next, each battery was discharged at constant current (CC), at a rate of 1/3C, down to a voltage of 3 V. Next, the secondary battery subjected to the activation treatment was charged at constant current (CC) at a rate of 1/3C, up to a state of state of charge (SOC) of 90%, in a temperature environment of 25° C. Herein "1C" denotes a current value for which battery capacity (Ah), predicted on the theoretical capacity of the active material, can be charged in 1 hour.

A thermocouple was attached to the central portion of the battery case, on the outer side, of each secondary battery having been adjusted to SOC 90%. The site at which the metal foreign fragment was disposed was pressed under predetermined conditions, from outside the battery case to thereby forcibly short-circuit the secondary battery, while the voltage across the external terminals of the battery was measured. Single-layer short circuits (micro short circuits) were deemed to occur when the voltage across terminals drops by 2 mV, and pressing was discontinued at the point in time where a single-layer short circuit (2 mV) was observed. The voltage drop derived from micro short circuits was calculated through measurement of the voltage 100 seconds after the short circuit. The temperature of the secondary battery after the short circuit was observed, to assess the highest temperature reached. The results are given in the corresponding columns of Table 1.

TABLE 1

| | | | | | Thermal shrinkage factor of insulating layer (%) | Short-circuit test | |
|---|---|---|---|---|---|---|---|
| | Inorganic filler | | | Mixing | | Voltage drop (mV) | Highest temperature reached (° C.) |
| Example | Composition | Form | Aspect ratio | ratio F:B | | | |
| 1 | Boehmite | Plate | 8.5 | 85/15 | 3 | 2 | 33 |
| 2 | Boehmite | Plate | 5.2 | 85/15 | 8 | 12 | 40 |
| 3 | Boehmite | Plate | 3.4 | 80/20 | 10 | 15 | 45 |
| 4 | Boehmite | Plate | 3.2 | 80/20 | 13 | 28 | 58 |
| 5 | Alumina | Plate | 3.2 | 80/20 | 11 | 14 | 45 |
| 6 | Boehmite | Plate | 2.4 | 80/20 | 18 | 130 | 83 |
| 7 | Boehmite | Plate | 1.2 | 70/30 | 30 | 1230 | Smoke |
| 8 | Boehmite | Spherical | 1.1 | 80/20 | 21 | 132 | 90 |

Evaluation: Thermal Shrinkage Factor

As Table 1 reveals, it was found that the thermal shrinkage factor of each insulating layer at the time of heating at 150° C. varied depending on the composition and the form of the inorganic filler that made up the insulating layer. Specifically, it was found that when the aspect ratio of the plate-shaped inorganic filler that made up the insulating layer was caused to vary from 1.2 to 8.5, the lower the aspect ratio was, the larger became the thermal shrinkage factor of the insulating layer, as observed in Examples 1 to 7. The plate-shaped inorganic filler is disposed, in an insulating layer formed in accordance with a slurry coating method, in a plane orientation, so that the surface direction of the plate-shaped inorganic filler is substantially parallel to the surface direction of the insulating layer (in other words, of the base material) and so that the plate-shaped inorganic filler is stacked in the thickness direction. The higher the aspect ratio of the inorganic filler, the smaller becomes number of adjacent particles within the plane of the insulating layer, per unit surface area; in other words, the smaller become the gaps between particles. As a result, even when a surface-direction force acts on a plate-shaped particle in the insulating layer, the plate-shaped particle collides against adjacent particles within the plane, after which it becomes difficult for the plate-shaped particle to move any further than the gap between particles. Movement of the inorganic filler in the surface direction, within the insulating layer is suppressed as a result, even in a case where the binder in the insulating layer softens or melts when exposed to a high temperature. Accordingly, it is deemed that the thermal shrinkage factor drops with increasing content of an inorganic filler of high aspect ratio in the insulating layer. The shrinkage factor of such an insulating layer is reduced to 13% or less also in a case for instance where the secondary battery generates heat up to about 150° C. Therefore, through arrangement of the insulating layer in a region along the edge of the positive electrode active material layer, at a portion opposing the negative electrode active material layer, it becomes possible to suitably suppress short circuits with the negative electrode that the insulating layer opposes, even when the separator is exposed at a high temperature at which the separator undergoes thermal shrinkage. A comparison between Examples 4 and 5 revealed that the thermal shrinkage factor can be kept slightly lower through the use of the of alumina having a higher melting point, and superior fire resistance, than in the case where boehmite is used as the inorganic filler.

By contrast, a granular inorganic filler exhibits substantially no shape anisotropy. Spherical particles of small aspect ratio exhibit a greater number of adjacent particles per unit surface area, within the plane, in the insulating layer, i.e. exhibit more gaps between particles. Therefore, when a force acts on a spherical particle in the surface direction, within the insulating layer, the spherical particle collides against adjacent particles within the plane, and moves readily thereafter together with the particles against which the spherical particle had collided. Also, the spherical particle can move along the surface of the particles against which the former collides (i.e. can move in thickness direction), and thus can move over a greater distance than the gap between particles. Plate-like inorganic filler particles of low aspect ratio can exhibit a behavior similar to that of such spherical particles. It is found that, when the binder in the insulating layer softens or melts, the inorganic filler in the insulating layer moves as a result easily in the surface direction, and the insulating layer undergoes readily thermal shrinkage.

A comparison between Example 7 and Example 8 revealed that when the amount of binder in the insulating layer is large, the inorganic filler moves easily on account of softening of the binder during heating, and the thermal shrinkage factor increases. Such being the case, it is considered that the proportion of the binder in the insulating layer is appropriately lower than 30 mass %, and is preferably 25 mass % or less, or 20 mass % or less, for instance 15 mass % or less.

Evaluation: Short Circuit Test

The results of the short circuit test revealed that the voltage drop and the highest temperature reached in the battery at the time of a forced short circuit vary on account of differences in the configuration of insulating layer juxtaposed within the positive electrode active material layer. There is a good correlation between voltage drop and the highest temperature reached. It was found that the voltage drop and the highest temperature reached correlate well with the thermal shrinkage factor of the insulating layer, and that the smaller the thermal shrinkage factor of the insulating layer is, the smaller becomes the voltage drop, and the lower is the highest temperature reached. In other words, it was found that the smaller the thermal shrinkage factor of the insulating layer is, the greater becomes the extent by which short circuits derived from a metal foreign fragment can be reduced, and the more short circuits can be suppressed to a light level. The width of the metal foreign fragment as the cause of short circuits, at the portion at which the metal foreign fragment abuts the insulating layer is small, of 100 µm. As a result, when the metal foreign fragment is physically pressed in the insulating layer, in the thickness direction, inorganic filler particles of low aspect ratio move readily and are easily pushed away, within the plane, even when the battery is in a state in which the binder is not softened or melted at normal temperature. As a result, the metal foreign fragment is likelier to bite into the insulating layer and reach the collector (to cause a short circuit). It is deemed that in the insulating layer of Example 7, in particular, where the binder amount is substantial, the inorganic filler particles move more readily within the plane, and the metal foreign fragment reaches easily the collector, whereby a short circuit occurs over a wide surface area, which translates into a large voltage drop. It is found that, as a result, the amount of generated heat on account of the short circuit increases, and the short circuit expands to a level at which safety decreases.

By contrast, inorganic filler particles of high aspect ratio do not move readily within the plane, in the insulating layer, and it is found that paths for contact with the collector do not form readily, even with pushing by the metal foreign fragment. It is found that, as a result, the metal foreign fragment is unlikelier to reach the collector easily, and even if a short circuit occurs, the surface area thereof is small, and the short circuit can be reduced to a slight level. In consequence it becomes possible to curtail widening of the short circuit surface area that accompanies generation of heat derived from the short circuit, and to suppress further generation of heat in the battery caused by that expanded short circuit surface area. From the above it was found that an insulating layer having a small thermal shrinkage factor allows suitably suppressing or reducing short circuits derived for instance from metal foreign matter, also at normal temperature.

Concrete examples of the art disclosed herein have been explained in detail above, but these examples are merely illustrative, and are not meant to limit the scope of the claims. The art set forth in the claims encompasses various alterations and modifications of the concrete examples illustrated above.

While the present invention has been described in detail, the above embodiments and examples are only illustrative, and the invention disclosed herein encompasses various modifications and changes to the specific examples described above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A nonaqueous electrolyte secondary battery, comprising:
   a positive electrode; a negative electrode; a separator that insulates the positive electrode and the negative electrode; and a nonaqueous electrolyte,
   wherein the positive electrode includes:
      a positive electrode collector;
      a positive electrode active material layer containing a positive electrode active material and provided on part of a surface of the positive electrode collector; and
      an insulating layer provided on another part of the surface of the positive electrode collector, so as to be adjacent to the positive electrode active material layer;
   the negative electrode includes:
      a negative electrode collector; and
      a negative electrode active material layer containing a negative electrode active material and provided on part of a surface of the negative electrode collector;
   a width of the negative electrode active material layer is wider than a width of the positive electrode active material layer,
   the insulating layer contains an inorganic filler and a binder; protrudes outward in a width direction from the negative electrode active material layer; and is configured to exhibit a value of 8% or less of a thermal shrinkage factor in a direction parallel to a surface of an evaluation sample of an insulating layer formed to a square shape having a length of each side of 5 cm and heated at 150° C. for 1 hour, and
   the insulating layer contains $Li_3PO_4$.

2. The nonaqueous electrolyte secondary battery according to claim 1, wherein the inorganic filler is at least either one of boehmite powder and alumina powder.

3. The nonaqueous electrolyte secondary battery according to claim 1, wherein, in the insulating layer, the proportion of the binder relative to the total of the inorganic filler and the binder is lower than 30 mass %.

4. The nonaqueous electrolyte secondary battery according to claim 1, wherein an average thickness of the insulating layer is smaller than 10 μm.

5. The nonaqueous electrolyte secondary battery according to claim 1, wherein an average thickness of the insulating layer is 5 μm or less.

6. The nonaqueous electrolyte secondary battery according to claim 1, wherein an average thickness of the positive electrode active material layer is 10 μm or more and 50 μm or less.

7. The nonaqueous electrolyte secondary battery according to claim 1, wherein the inorganic filler contains boehmite.

8. The nonaqueous electrolyte secondary battery according to claim 1, wherein the inorganic filler contains plate-shaped particles having an average aspect ratio of 8 or higher, and the insulating layer is configured to exhibit a value of 4% or less of a thermal shrinkage factor.

9. The nonaqueous electrolyte secondary battery according to claim 1, wherein the binder in the insulating layer comprises polyvinylidene fluoride.

10. The nonaqueous electrolyte secondary battery according to claim 1, wherein a proportion of the binder contained in the insulating layer is 15 mass % or less.

11. The nonaqueous electrolyte secondary battery according to claim 1, wherein a ratio T1/T2, where T1 denotes an average thickness of the insulating layer and T2 denotes an average thickness of the positive electrode active material layer, is 1/3 or lower.

12. The nonaqueous electrolyte secondary battery according to claim 11, wherein the ratio T1/T2 is 1/4 or lower.

13. The nonaqueous electrolyte secondary battery according to claim 11, wherein the ratio T1/T2 is 1/5 or lower.

14. The nonaqueous electrolyte secondary battery according to claim 1, wherein a basis weight of the insulating layer is 0.5 mg/cm$^2$ or more and 1.5 mg/cm$^2$ or less.

15. The nonaqueous electrolyte secondary battery according to claim 1, wherein the inorganic filler contains plate-shaped particles having an average aspect ratio of 5 or higher.

16. The nonaqueous electrolyte secondary battery according to claim 1, wherein the $Li_3PO_4$ in the insulating layer has a specific surface area of 0.9 to 20.3 m$^2$/g and an average particle size of 1 μm or more and 10 μm or less.

17. The nonaqueous electrolyte secondary battery according to claim 1, wherein an average particle size of the inorganic filler in the insulating layer is less than an average particle size of the $Li_3PO_4$ in the insulating layer, and the average particle size of the $Li_3PO_4$ in the insulating layer is less than an average particle size of the positive electrode active material.

18. The nonaqueous electrolyte secondary battery according to claim 1, wherein the positive electrode active material layer comprises $Li_3PO_4$.

19. The nonaqueous electrolyte secondary battery according to claim 18, wherein the positive electrode active material layer comprises $Li_3PO_4$ in an amount of 0.88 to 8.8 parts by mass relative to 100 parts by mass of the positive electrode active material.

20. The nonaqueous electrolyte secondary battery according to claim 18, wherein the $Li_3PO_4$ in the positive electrode active material layer has a specific surface area of 0.9 to 20.3 m$^2$/g, an average particle size of 1 μm or more and 30 μm or less, a $D_{90}$ of 60 μm or less, a $D_{10}$ of 0.3 μm or more, and a $D_{max}$ of 80 μm or less.

* * * * *